United States Patent
Ryuutou et al.

(10) Patent No.: US 7,072,965 B2
(45) Date of Patent: Jul. 4, 2006

(54) COMMUNICATION DISTRIBUTION CONTROLLING METHOD AND APPARATUS HAVING IMPROVED RESPONSE PERFORMANCE

(75) Inventors: Takeshi Ryuutou, Kawasaki (JP); Yoshitaka Kizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 652 days.

(21) Appl. No.: 10/008,747

(22) Filed: Dec. 6, 2001

(65) Prior Publication Data

US 2002/0083191 A1    Jun. 27, 2002

(30) Foreign Application Priority Data

Dec. 21, 2000  (JP) .............................. 2000-388128

(51) Int. Cl.
  *G06F 15/16* (2006.01)
(52) U.S. Cl. .................. 709/227; 709/228; 709/245
(58) Field of Classification Search ................ 709/227, 709/228, 245
  See application file for complete search history.

(56) References Cited

U.S. PATENT DOCUMENTS

| | | | | |
|---|---|---|---|---|
| 5,553,242 A | * | 9/1996 | Russell et al. | 709/227 |
| 5,822,585 A | * | 10/1998 | Noble et al. | 719/316 |
| 5,925,098 A | * | 7/1999 | Freund et al. | 709/203 |
| 6,023,722 A | * | 2/2000 | Colyer | 709/201 |
| 6,247,057 B1 | * | 6/2001 | Barrera, III | 709/229 |
| 6,314,463 B1 | * | 11/2001 | Abbott et al. | 709/224 |
| 6,505,250 B1 | * | 1/2003 | Freund et al. | 709/226 |
| 6,522,880 B1 | * | 2/2003 | Verma et al. | 455/436 |
| 6,678,733 B1 | * | 1/2004 | Brown et al. | 709/229 |
| 6,766,373 B1 | * | 7/2004 | Beadle et al. | 709/227 |
| 6,772,333 B1 | * | 8/2004 | Brendel | 713/153 |
| 6,785,812 B1 | * | 8/2004 | Botham et al. | 713/168 |
| 6,813,629 B1 | * | 11/2004 | Kocherlakota et al. | 709/203 |

OTHER PUBLICATIONS

Yasuhiro Kawai, "I-Mode can now be used for stock trades; Way to maintain a session and to accomplish load distribution," Nikkei Internet Technology, No. 38, Aug. 22, 2000, p. 22.

N. Osawa et al., "Effectiveness of connection caching on the World Wide Web," Research reports of the Information Processing Society, vol. 98, No. 15 98-OS-77 98-DPS-87, Feb. 26, 1998, pp. 209-214.

* cited by examiner

*Primary Examiner*—Krisna Lim
(74) *Attorney, Agent, or Firm*—Greer, Burns & Crain, Ltd.

(57) ABSTRACT

A connection request from a client is received to distribute one communication within a series of communications to any of a plurality of relay devices, which can relay the one communication, in correspondence with the connection request from the side of the client. Whether or not a connection corresponding to the series of communications is established is determined according to an identifier written in the request. If the connection is established, the requested communication is connected to a relay device as a relay destination of the established connection.

9 Claims, 13 Drawing Sheets

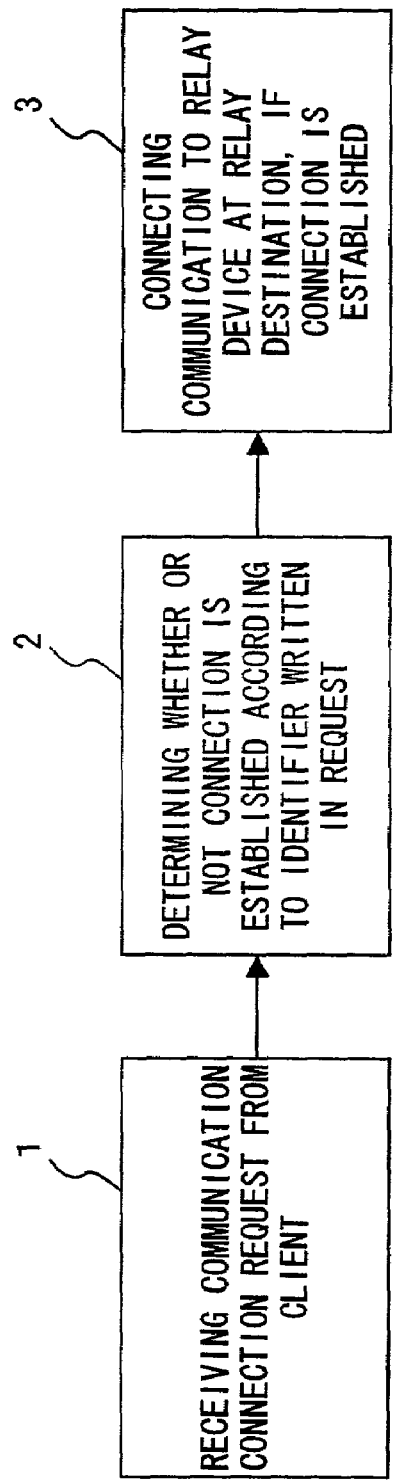
F I G. 1 http//A/B/C/・・・

COMMUNICATION DISTRIBUTION CONTROLLING METHOD AND APPARATUS HAVING IMPROVED RESPONSE PERFORMANCE

BACKGROUND OF THE INVENTION

1. Field of the Invention

The present invention relates to a communication distribution controlling method, and more particularly, to a communication distribution controlling method and apparatus with which a server that receives a communication connection request from a client side distributes the communication to any of a plurality of different servers, for example, on the Internet.

2. Description of the Related Art

The present invention targets a communications system having, for example, an object request broker (ORB) mechanism. The ORB is a mechanism for making a method or function call between computers, namely, nodes in a distributed computing environment, and is used in a standard communications channel between distributed objects. This standard is an industry standard set by an object management group (OMG), and is adopted by a variety of vendors.

The ORB is a method with which a client request is conveyed to an object, which object is made to perform an operation corresponding to the requests, and returns a result of the operation to the client.

FIG. 13 exemplifies a conventional CORBA communication method using HTTP tunneling, with which a client requests a CORBA application (AP) server where a process by an object is performed to execute a process, and receives a result of the process as described above.

FIG. 13 assumes that a personal computer (PC) 101 that requests a process, and a CORBA AP server 104a that executes the requested process, are connected via the Internet.

Normally, a communication using IIOP (Internet Inter-ORB Protocol), which is a communications protocol between objects on TCP/IP and laid down by the OMG, is the most efficient communication between a PC on a client side and a CORBA application server. Even if a program executed by a client and one executed by a remote server are written in different languages, the client can communicate with the remote server.

However, when a communication is made between a client and a CORBA AP server via the Internet, the HTTP tunneling, which converts a protocol of the communication into IIOP protocol and makes a communication, must be normally used. Normally, the PC 101 must perform protocol conversion from IIOP to HTTP, and a relay server at a stage preceding the CORBA AP server 104a must perform protocol conversion from HTTP to IIOP.

FIG. 13 assumes that the PC 101 on the client side requests the CORBA AP server 104a to execute a process corresponding to one session, that is, communications transactions. The transactions of one session are composed of, for example, four stages ((1) to (4), FIG. 13), in each of which a communication for receiving a process request to the CORBA AP server 104a, and a reply to the request, becomes necessary. This communication is assumed to be intermittently made between the PC 101 and the CORBA AP server 104a in each of the stages.

The PC 101 on the client side provides a relay Web server 102 on the client side with a communication connection and process request (1) in the first stage, which is made to the CORBA AP server 104a, via a connection 105a at the start of a session. The relay Web server 102 selects any of a plurality of different Web servers on the CORBA AP server side, which can relay the communication to the CORBA AP server 104a, and transmits the request (1) to the selected different Web server, 103a in this case, via a connection 106a. This request is provided from the different Web server 103a to the CORBA AP server 104a.

Upon termination of the process on the CORBA AP server 104a side, its result is provided as a reply (1) to the PC 101 via the different Web server 103a, the connection 106a, the relay Web server 102, and the connection 105a. The connection between the relay Web server 102 and the different Web server 103a is released after the reply is completed.

Thereafter, when a communication connection and process request (2) in the second stage is provided from the PC 101 to the relay Web server 102 via a connection 105b within the session on the client side, the relay Web server 102 again selects any of the plurality of different Web servers 103a to 103n, which can relay the communication to the CORBA AP server 104a (103n in this example), and provides the selected different Web server with the request (2) via a connection 106b. The request (2) is then provided from the selected different Web server to the CORBA AP server 104a.

As described above, with the conventional CORBA communication method using the HTTP tunneling, a connection between a relay Web server and a different Web server at a stage preceding a CORBA AP server is released upon completion of a reply to a request from a client. Therefore, even a communication within the same session from the same client cannot be made via the same different Web server, and additional time to establish a connection is required for each communication. Furthermore, a communication for returning a reply must be distributed also on a CORBA AP server side, leading to degradation in response performance.

As described above, with the conventional CORBA communication method using the HTTP tunneling, a connection between a relay Web server and a different Web server at a stage preceding a CORBA AP server is released upon completion of a reply to a request from a client. Therefore, even a communication within the same session from the same client cannot be made via the same different Web server, and a time to establish a connection is required for each communication. Furthermore, a communication for returning a reply must be distributed also on a CORBA AP server side, leading to degradation in response performance.

SUMMARY OF THE INVENTION

An object of the present invention is to improve the response performance of a CORBA communication using the HTTP tunneling by making a communication corresponding to a communication connection request from a client within one session via the same different Web server, in view of the above described problem.

A communication distribution controlling method according to a first preferred embodiment of the present invention is a communication distribution controlling method distributing one communication to any of a plurality of relay devices, which can relay the one communication, in correspondence with a connection request of the one communication within a series of communications from a client. With this method, a communication connection request is received from a client, whether or not a communication connection corresponding to a series of communications is established according to an identifier written in the communication connection request, and the requested communication is connected to a particular relay device as a relay destination of an established communication connection if the communication connection is established.

A communication distribution controlling method according to a second preferred embodiment of the present invention is a communication distribution controlling method distributing one communication to any of a plurality of relay devices, which can relay the one communication, in correspondence with a connection request of the one communication within a series of communications from a client. With this method, a connection request of the initial communication within a series of communications from a client is received, a communication connection for the communication requested to be connected is established, and the requested communication is connected to a particular relay device as a relay destination of the established connection.

As described above, according to the present invention, a communication connection is established in the initial communication within a series of communications made during one session, and fundamentally maintained until the series of communications during that session is completed.

BRIEF DESCRIPTION OF THE DRAWINGS

The present invention will be more apparent from the following detailed description, with reference to the accompanying drawings, in which:

FIG. 1 is a block diagram showing the functions of a communication distribution controlling method according to the present invention;

FIG. 10 exemplifies header information;

DESCRIPTION OF THE PREFERRED EMBODIMENTS

FIG. 1 is a block diagram showing functions of a communication distribution controlling method distributing one communication to any of a plurality of relay devices, which can relay the one communication, in correspondence with a connection request of the one communication within a series of communications from a client that can be, for example, a series of communications required within one session.

With the communication distribution controlling method according to one embodiment of the present invention, a communication connection request from a client is received in block 1; whether or not a communication connection corresponding to a series of communications is established according to an identifier such as a session identifier, which identifier is written in the communication connection request block 2, and the requested communication is connected to a particular relay device as a relay destination of the established communication connection if the communication connection is established in block 3.

Figure 2:
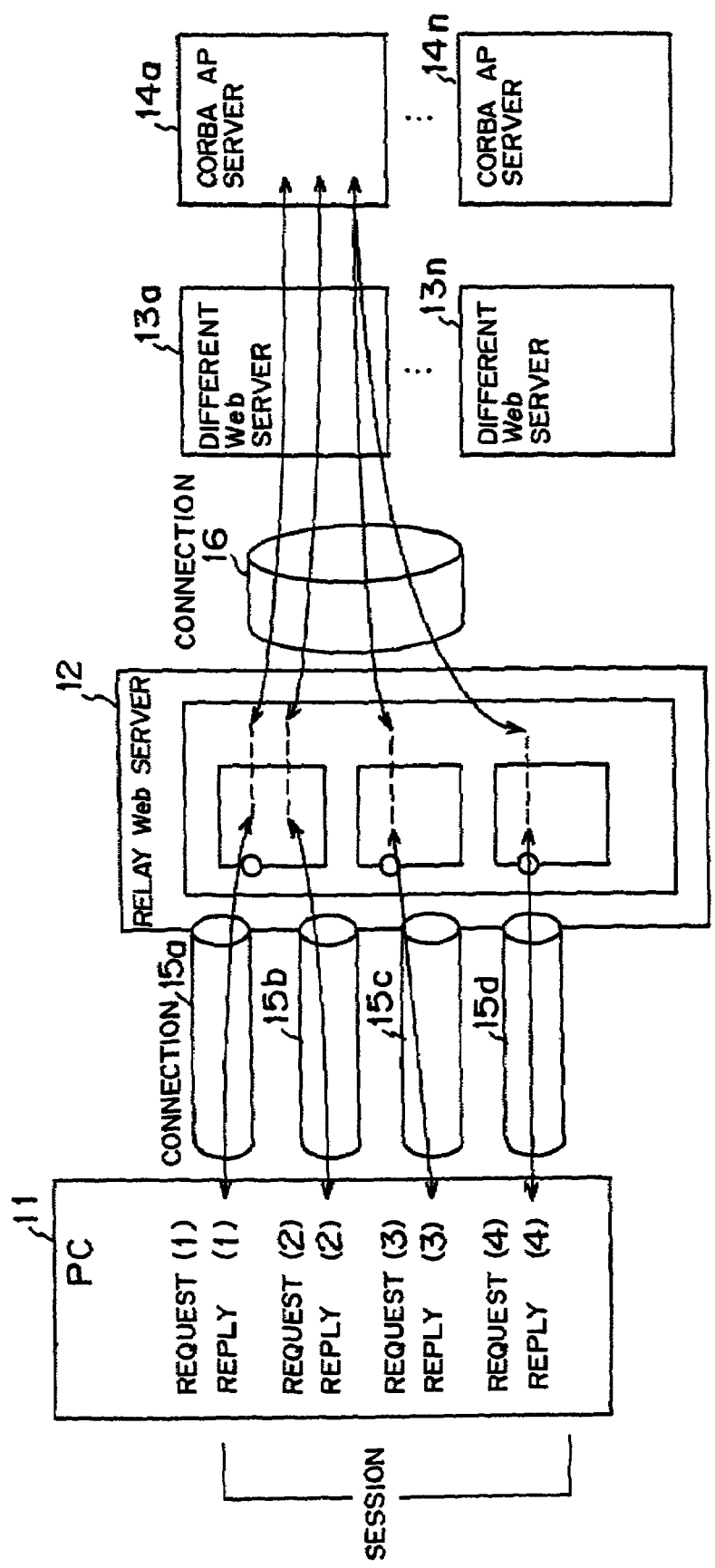
FIG. 2 is a block diagram showing the fundamental configuration of a communications system to which the communication distribution controlling method according to the present invention is applied.

FIG. 2 is a block diagram showing the fundamental configuration of a communications system to which a communication distribution controlling method according to the present invention is applied. This figure assumes that a personal computer (PC) 11 on a client side requests one CORBA AP server, for example, 14*a* to perform a process required for executing a session on the client side among a plurality of CORBA application (AP) servers, which respectively perform unique processes, via a relay Web server 12 on the client side.

Note that, however, which of the plurality of CORBA AP servers executes the requested process does not matter to the PC 11 on the client side. The client side is assumed not to learn that the process is executed by the CORBA AP server 14*a*.

As described above, the process for the session, which is executed by the PC 11 on the client side, can be effectively executed by directly connecting the PC 11 and the CORBA AP server 14*a* with a transmission line using the IIOP protocol. For example, if the Internet is used, not only a plurality of relay servers such as a proxy server, a gateway, etc., but also a firewall normally exists between the PC 11 and the CORBA AP server 14*a*. Accordingly, a communication using the IIOP protocol is normally impossible within the Internet, and a communication must be made by converting its protocol into HTTP protocol within the Internet.

For this reason, a request (1) corresponding to one communication within a session as a series of communications from the PC 11 on the client side is provided to a relay Web server 12 on the client side via a connection 15*a*, and is further provided from one different Web server 13*a* on a CORBA AP server side to a CORBA AP server 14*a* via a connection 16.

A result of executing the process for the request (1) is provided from the CORBA AP server 14*a* to the PC 11 as a reply (1) via the different Web server 13*a*, the connection 16, the relay Web server 12, and the connection 15*a*.

When a request (2) as the next communication within one session is provided from the PC 11 to the relay Web server 12 via a connection 15*b*, it is provided to the CORBA AP server 14*a* via the connection 16 and the different Web server 13*a*. Its process result is provided to the PC 11 on a reverse route.

As described above, a communication connection between the PC 11 on the client side and the relay Web server 12 is released when a reply to one request is obtained within one session. Namely, the connection 15*a* is used for the request (1) and the reply (1), whereas the connection 15*b* is used for the request (2) and the reply (2).

However, according to the present invention, the connection 16 between the relay Web server 12 and the different Web server 13*a* is maintained, by way of example, for a predetermined time period without being released even if the reply (1) is terminated. If the next request (2) is made during the predetermined time period, the communication for the request (2) and the reply (2) are also made via the same connection 16. Nevertheless, the communication between the relay Web server 12 and the CORBA AP server 14a are made via the different Web server 13a in all cases.

Similarly, a communication for a request (3) and a reply (3), and one for a request (4) and a reply (4) are made between the relay Web server 12 and the CORBA AP server 14a via the connection 16 and the different Web server 13a.

Figure 3:
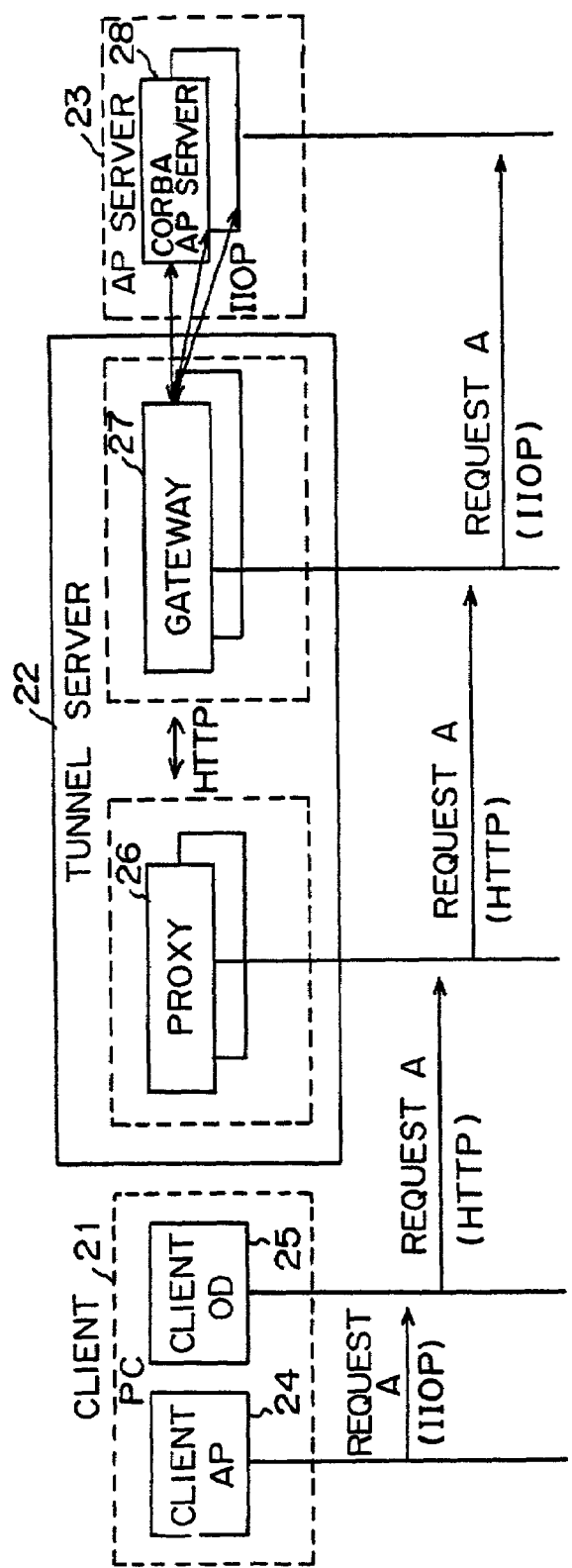
FIG. 3 explains a communication method using tunneling between a client side and a CORBA AP server.

FIG. 3 explains a communication method using tunneling between a client and a CORBA AP server in this preferred embodiment. The tunneling is intended to transfer data of one network via another by using the Internet. With the tunneling, a frame generated by a transmitting source node is encapsulated with an additional header, whose contents are used as routing information, and the encapsulated data is transferred via a network different from the transmitting source network.

In FIG. 3, a process request A from a PC 21 on a client side is transferred to an AP server 23 side via a tunnel server 22. The PC 21 on the client side is configured by a client application (AP) 24, and a client object director (OD) 25 that converts a protocol of a process request from IIOP to HTTP on the client side. The request A from the client side is converted from IIOP to HTTP protocol, and provided to the tunnel server 22.

The tunnel server 22 is normally configured by a plurality of proxies (proxy servers) 26 and a plurality of gateways 27. The request A from the client side is provided from one of the plurality of proxies 26 to one of the plurality of gateways 27. The gateway 27 performs protocol conversion from HTTP to IIOP, and provides the request A to one of CORBA AP servers 28, which executes the process corresponding to the request A.

Figure 4:
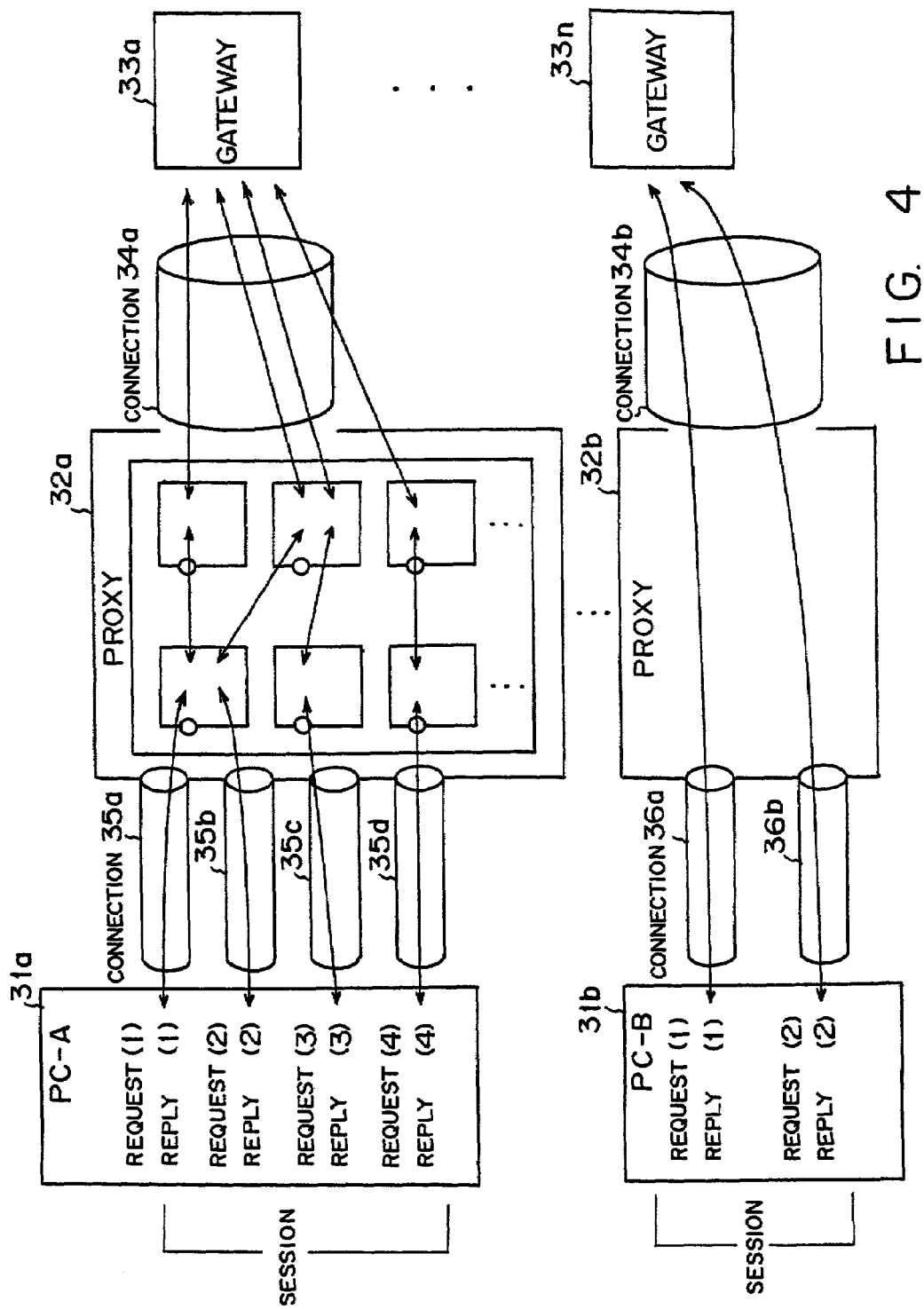
FIG. 4 is a block diagram exemplifying the configuration of a communications system supporting a plurality of clients.

FIG. 4 is a block diagram exemplifying the configuration of a communications system supporting a plurality of clients in this preferred embodiment. This figure assumes that personal computers PC-A 31a and PC-B 31b, which respectively correspond to two clients, execute one session respectively.

In FIG. 4, a communication between the PC-A 31a and a CORBA AP server not shown, that is, a CORBA AP server which performs the process corresponding to the session executed by the PC-A 31a is made via a proxy 32a and a gateway 33a, which respectively correspond to the relay Web server 12 and the different Web server 13a in FIG. 2.

The communication connection between the PC-A 31a and the proxy 32a is released each time a reply to one request is terminated. However, the communication connection between the proxy 32a and the gateway 33a is not fundamentally released during one session, and a connection 34a is continuously used.

Similarly, the communication between the PC-B 31b and a CORBA AP server that performs the process corresponding to the session executed by the PC-B 31b is made via a proxy 32b and a gateway 33n. The communication connection between the proxy 32b and the gateway 33n is fundamentally maintained during one session, and a communication is made via one connection 34b.

Figure 5:
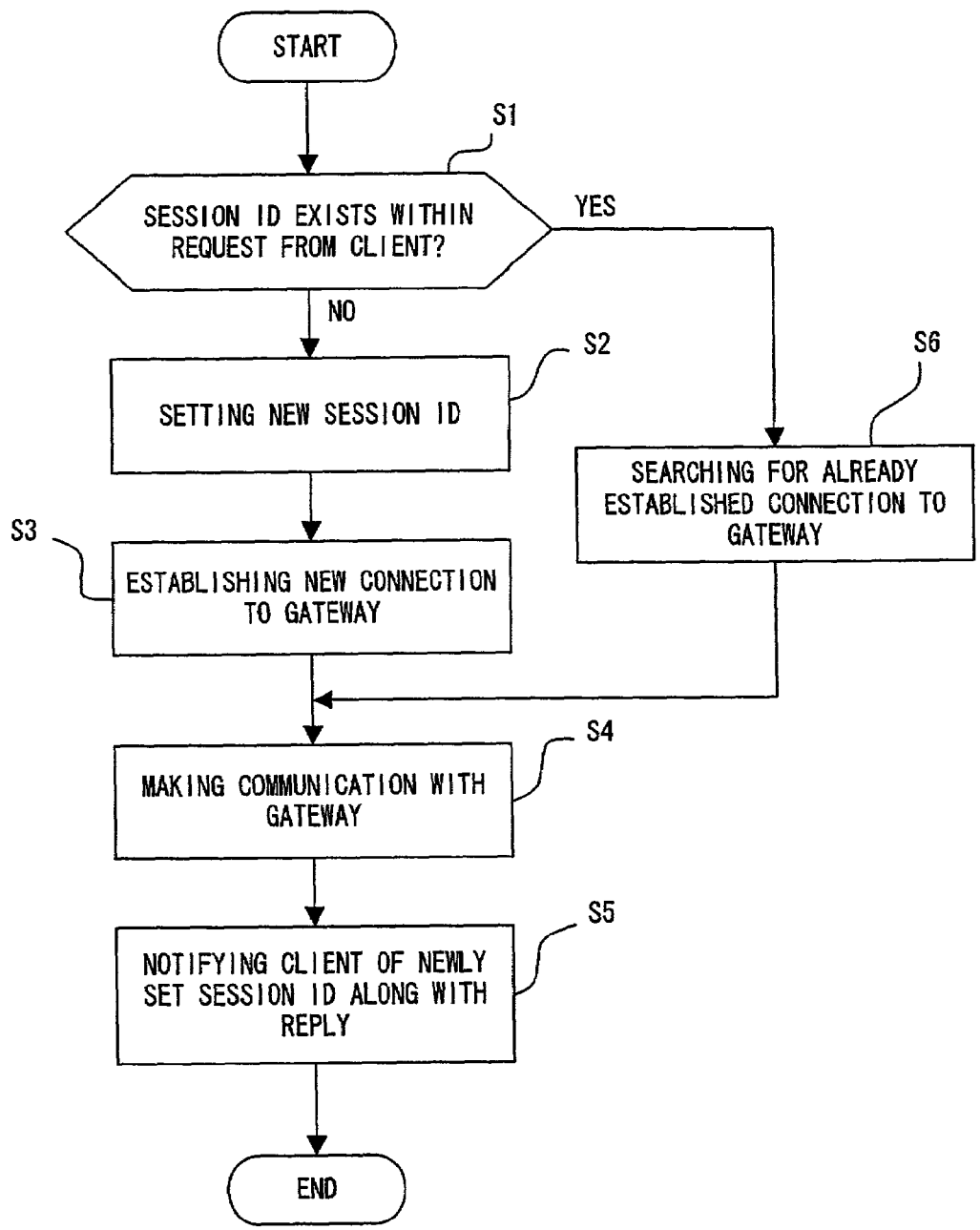
FIG. 5 is a flowchart showing the process of a communication management method according to a preferred embodiment.

FIG. 5 is a flowchart showing the process of a communication management method in this preferred embodiment. This figure is a flowchart showing the process that is performed, for example, by the proxy 32a shown in FIG. 4, namely, in correspondence with a request in accordance with the session on the client side, that is, a communication connection (and process) request.

Once the process is started in FIG. 5, it is first determined in step S1 whether or not a session ID (identifier) is written in a request from the client side. This session ID is intended to identify one session corresponding to a series of communications from the client side. As will be described later, for example, an IP address of a client can be used as the value of the identifier, and this value is written in URL or header information within a communication connection request. If it is determined that the session ID is not written in the request from the client side in step S1, a series of communications corresponding to one session is started in correspondence with the communication connection request. In step S2, a new session ID is set for this session. In step S3, a new connection 34a is established between the proxy 32a and, for example, the gateway 33a. In step S4, a communication is made with the gateway 33a. In step S5, the session ID that is newly set in step S2 is notified within the reply by which a process result from a CORBA AP server is returned to the client side. The process is then terminated.

If it is determined that the session ID is written in the request from the client side in step S1, the already established connection of the gateway corresponding to the session ID that is stored, for example, in a memory (table) within the proxy 32a is searched in step S6. After the communication with the gateway is made in step S4, only a reply is returned in step S5, and the process is terminate. because a new session ID is not set in this case.

If a communication connection request is the initial request (for example, the request (1) from the PC-A 31a in FIG. 4), the operations in steps S2 and S3 are performed, and a session ID is notified to the PC-A 31a within the reply (1) in step S5. For the next communication connection request, that is, the request (2), the operation in step S6 is performed, but the operation for notifying a session ID in step S5 is not performed.

However, if an IP address of a client is used as a session ID, the IP address naturally exists within a communication connection request in all cases. Therefore, the session ID is determined to be written also in the initial communication connection request in step S1, and a new connection is established instead of searching for an already established connection in step S6. Then, in step S4, a communication is made with a gateway. The operation for notifying a session ID in step S5 is not performed in this case.

Figure 6:
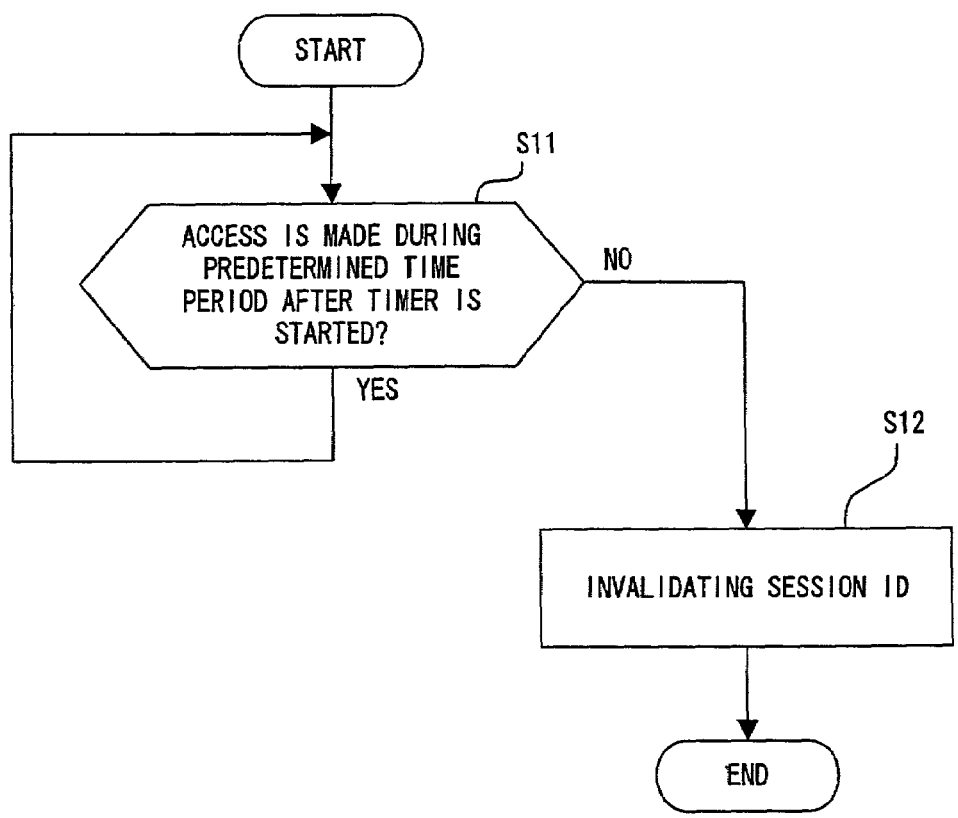
FIG. 6 is a flowchart showing the process of a communication connection management method.

FIG. 6 is a flowchart showing the process of a communication connection management method in this preferred embodiment. In FIG. 5, when a new communication connection to a gateway is established in correspondence with the initial communication connection request within one session, and a session ID is set, its contents are stored in a memory (table, not shown). At the same time, a timer (also not shown) is started, and its elapsed time is monitored.

In step S11 of FIG. 6, whether or not an access, that is, the next communication connection request within one session, is made during a predetermined time period after the timer is started, which is determined, for example, by the proxy 32a. If this access is determined to be made, the operation in step S11 is continued.

Or, if the access is determined not to be made during the predetermined time period, a set session ID is invalidated in step S12, and the established communication connection is released. The process is then terminated. A predetermined time period (for example, 30 minutes as a continuation time of one session, which is a de facto standard in the Internet industry) can thus be set.

Figure 7:
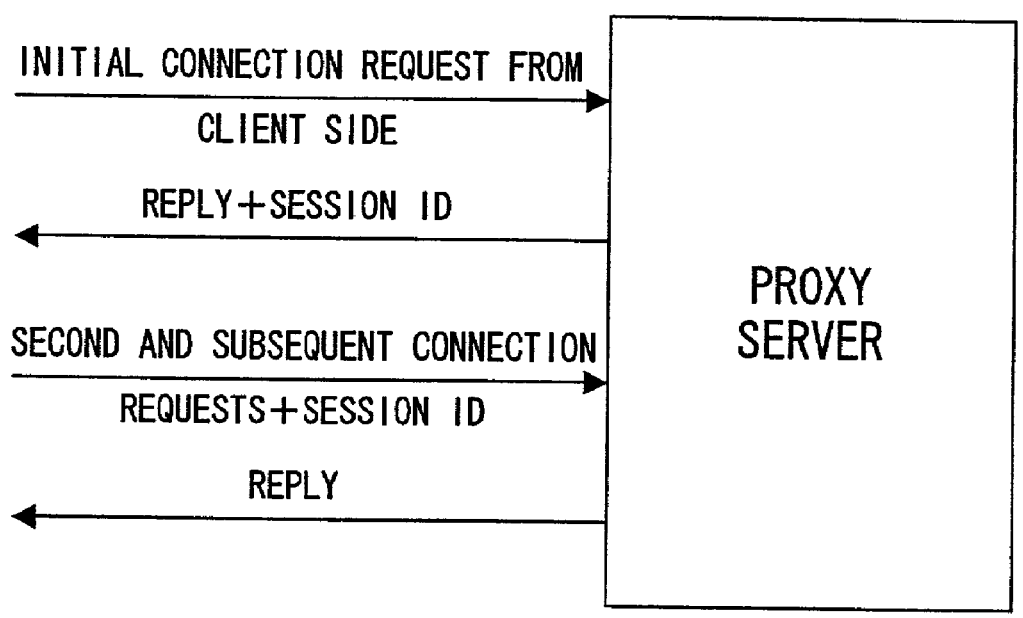
FIG. 7 explains a communication method between a personal computer (PC) on a client side and a proxy server.

FIG. 7 explains a communication method, for example, between the PC-A 31a and the proxy (server) 32a in FIG. 4.

In FIG. 7, the initial communication connection request from a client side, which corresponds to the request (1) in FIG. 4 (namely, login as a connection establishment request is made), a reply corresponding to the reply (1), in which a session ID is added to a result of a process performed by a CORBA AP server, is returned from the proxy 32*a*. The second and subsequent communication connection requests from the client side, namely, the requests (2), (3), and (4) in FIG. 4, provide the session ID to the proxy 32*a* in addition to the connection process request from the client side, and replies are respectively returned to the requests.

In this preferred embodiment, for a method determining a request corresponding to one session that is executed by a client as described above, for example, a method determining the communication connection requests (1) through (4) (which are made by the PC-A 31*a* in FIG. 4) to be requests corresponding to the same session, any of three methods such as a method using an IP address of a client as a session identifier, a method including session information within URL information, and a method including a session identifier within header information can be used.

Figure 8:
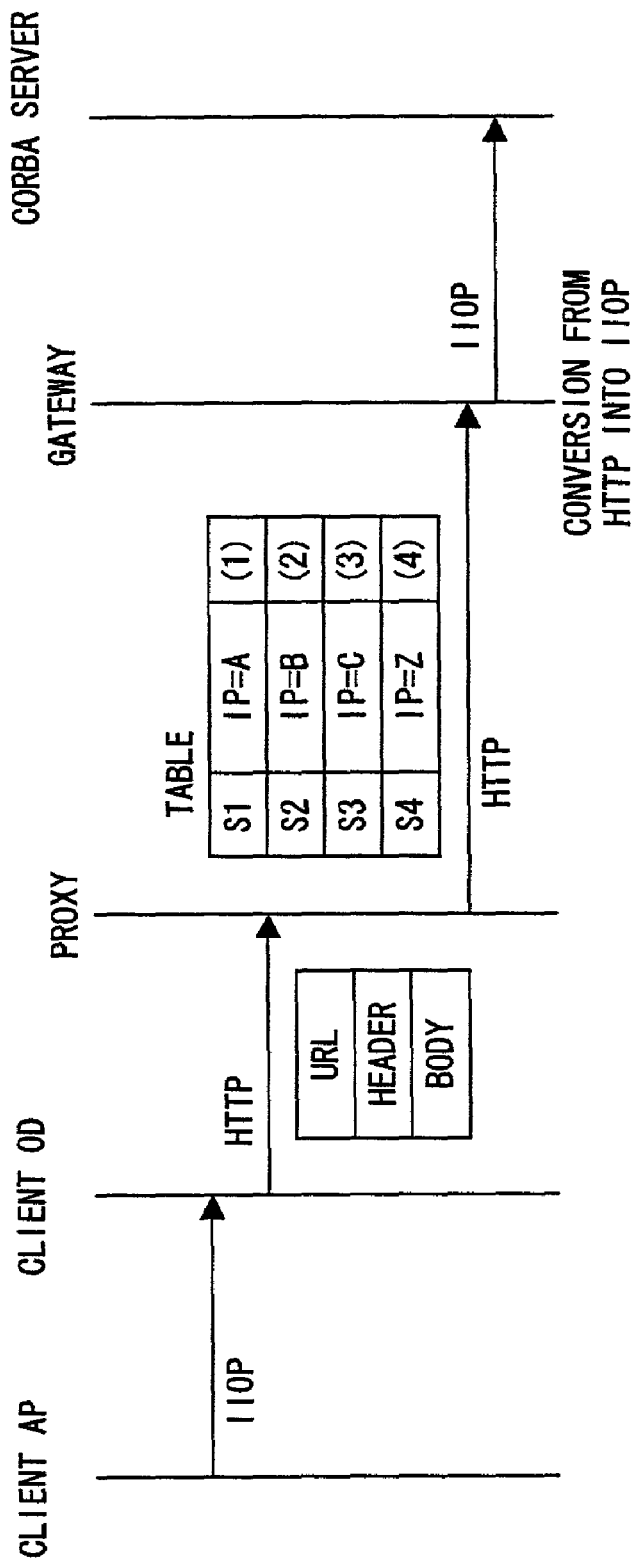
FIG. 8 explains a communication method when an IP address is used as a session ID.

FIG. 8 explains a communication connection method when an IP address of a client is used as a session identifier. In this figure, a communication connection (and process) request using IIOP protocol from a client side (for example, the client AP shown in FIG. 3) is converted by the client OD into HTTP protocol, and the communication connection request after being converted is output to a proxy side in a form including URL, a header, and a body.

If the IP address of the client that currently requests a connection is, for example, B, the connection (2) is selected as a connection to the gateway side, and the communication connection request is transmitted to the gateway as a destination of this connection. Then, the gateway performs protocol conversion from HTTP to IIOP, and the request that is converted into IIOP is transmitted to a CORBA AP server.

If the IP address written in the communication connection request transmitted from the client side to the proxy is not stored in the table within the proxy, a connection such as a connection (4) for transmitting the IP address and a communication of a new session is established for the new session, by way of example, S4, and the communication connection request is transmitted to a gateway at a destination of the connection (4).

If an IP address is used as a session identifier, the same connection is used for the same client even if sessions differ. Namely, a communication connection request from the client whose IP address is B is always made by using the connection (2). Accordingly, the gateway at the destination of this connection is always the same. Therefore, even if CORBA AP servers that perform processes required for executing two sessions differ, communications are made between the proxy and the gateway by using the same connection.

Figure 9:
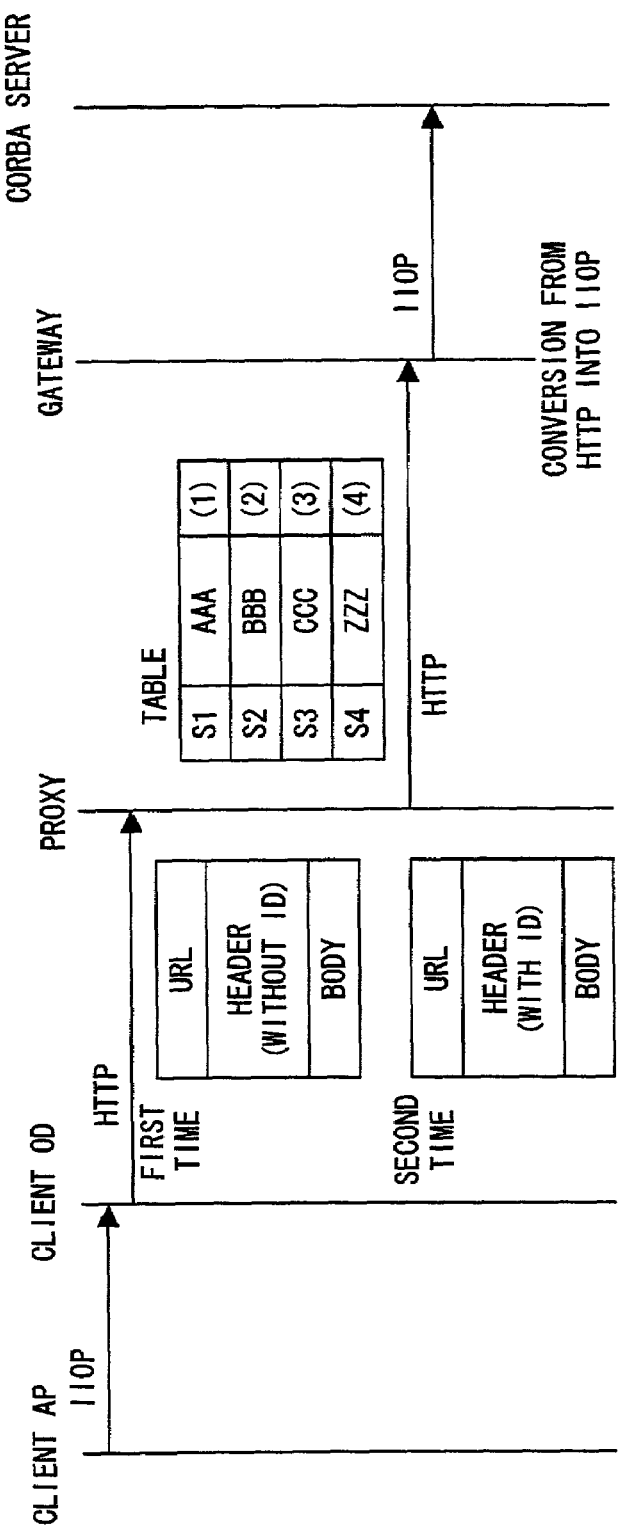
FIG. 9 explains a communication method when a session ID is included in header information.

FIG. 9 explains a communication method when a session identifier is included in header information. In this figure, a request composed of URL, a header, and a body is transmitted from the client side to the proxy side as the initial communication connection request in a similar manner as in FIG. 8.

A TABLE within the proxy stores, by way of example, for session numbers S1 through S3, a session identifier to be added to header information, for example, AAA corresponding to the session number S1, and a number (1) of a communication connection to a gateway, which is intended to transmit the communication corresponding to the session. The already stored session identifiers and connection numbers refer to identifiers of sessions whose communications have been started, and to numbers of connections established for the sessions, respectively.

If the request transmitted from the client side is the initial communication connection request, its header information does not include a session identifier. Therefore, by way of example, S4, ZZZ, and (4) are respectively stored in the table on the proxy side as a session number, a session identifier, and a corresponding communication connection in correspondence with the initial connection request. The communication connection request is provided to the gateway via the communication connection (4), and protocol conversion is then performed in a similar manner as in FIG. 8. As a result, data of the connection (and process) request is provided to the CORBA AP server.

Figure 10:
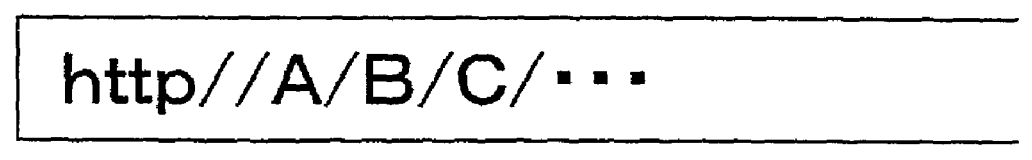

FIG. 10 exemplifies the header information in the initial communication connection request explained with reference to FIG. 9. In this header information, A and B indicate transactions performed in correspondence with a session, and C indicates an argument. Data is not written between B and C in this header information, which indicates that the request is the initial communication connection request.

As explained with reference to FIG. 9, the session number S4 and the session ID ZZZ are set by the proxy in correspondence with this communication connection request. The newly set session ID is added to the header information, for example, within the reply (1) to the PC-A 31*a* in FIG. 4, and returned from the proxy 32*a* to the client side.

At this time, ZZZ as the session ID is added between B and C in the header information shown in FIG. 10. As a method adding a session ID, a method such as Netscape Cookie, with which a browser side can recognize and store, for example, data that is additionally described in an HTTP header, is used.

A reply including header information to which a session ID is added is returned from a proxy side to a PC side as described above, so that header information including the session ID can be used as the header information in the second and subsequent communication connection requests.

Figure 11:
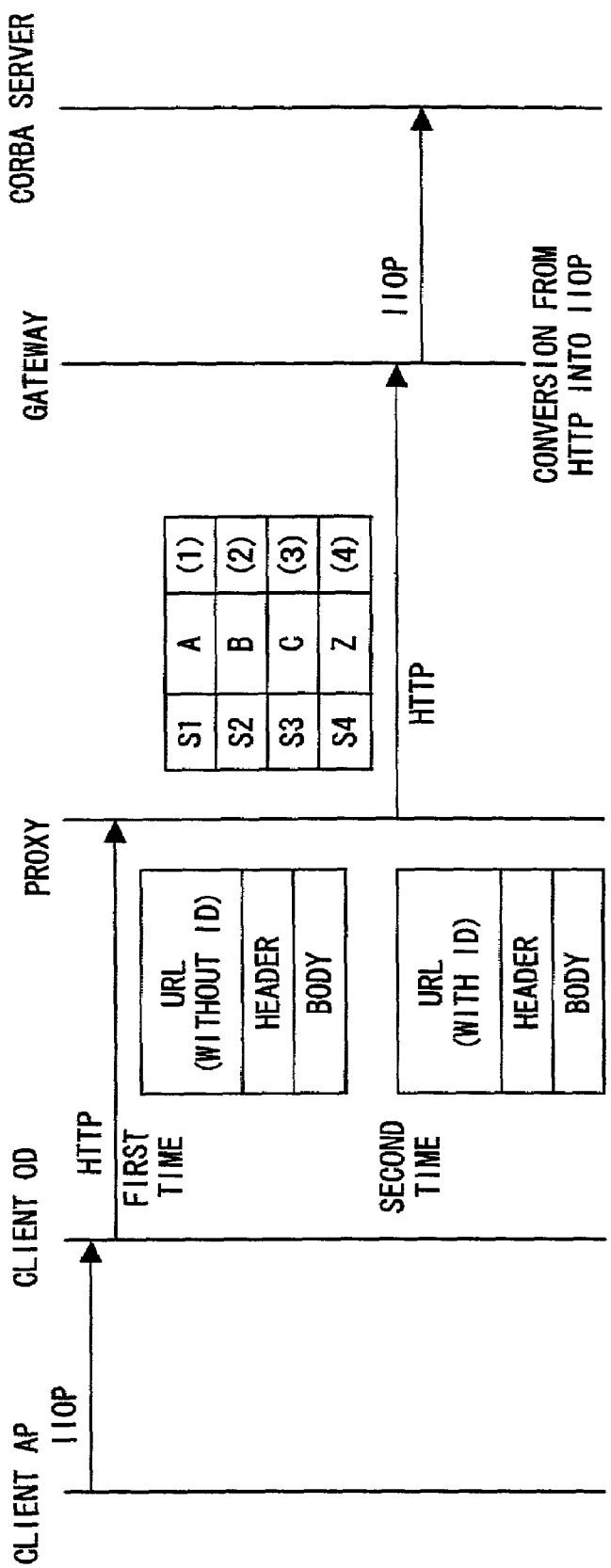
FIG. 11 explains a communication method when a session ID is included in URL.

FIG. 11 explains a communication method when a session ID is added to the URL. The method shown in FIG. 11 is almost similar to that in FIG. 9. However, there is a difference in a point that a session ID is added not to header information but to URL. In a similar manner as in FIG. 9, the URL does not include a session ID in the initial communication connection request. A communication connection request is transmitted to a gateway via an established communication connection (4) in correspondence with a session ID newly set by a proxy, for example, Z. The established session ID Z is added to the URL within the reply to the request, and transmitted to the client side. The set session ID such as Z is added to the URL in the second and subsequent communication connection requests, and transmitted to the proxy.

Figure 12:
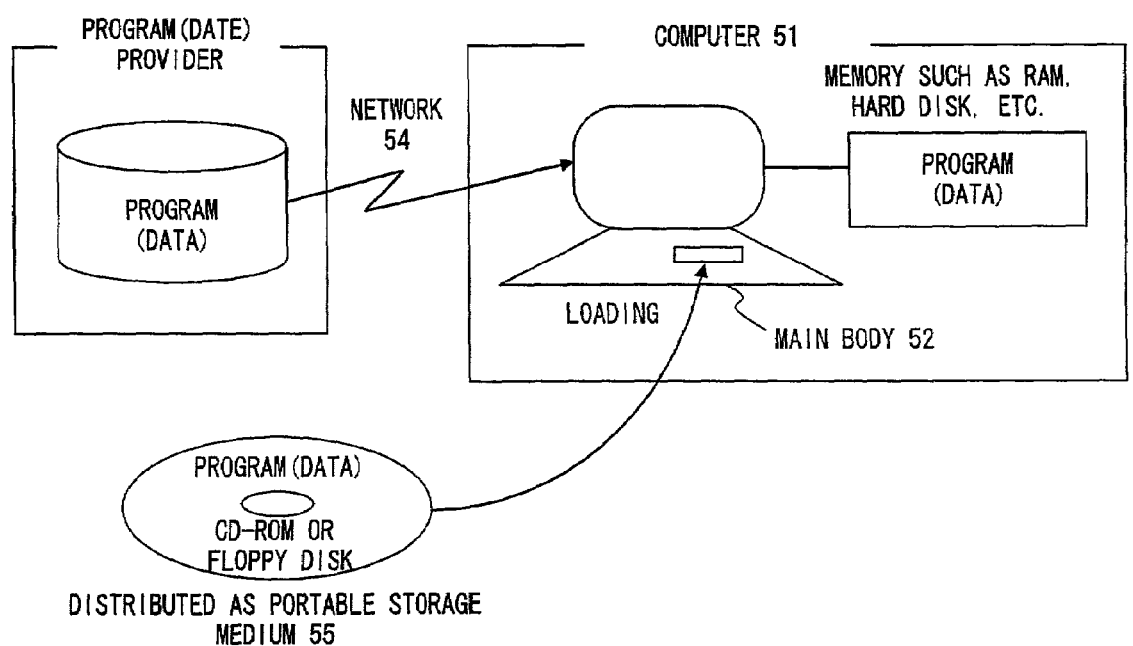
FIG. 12 explains the loading of a program for implementing the present invention into a computer.
Figure 13:
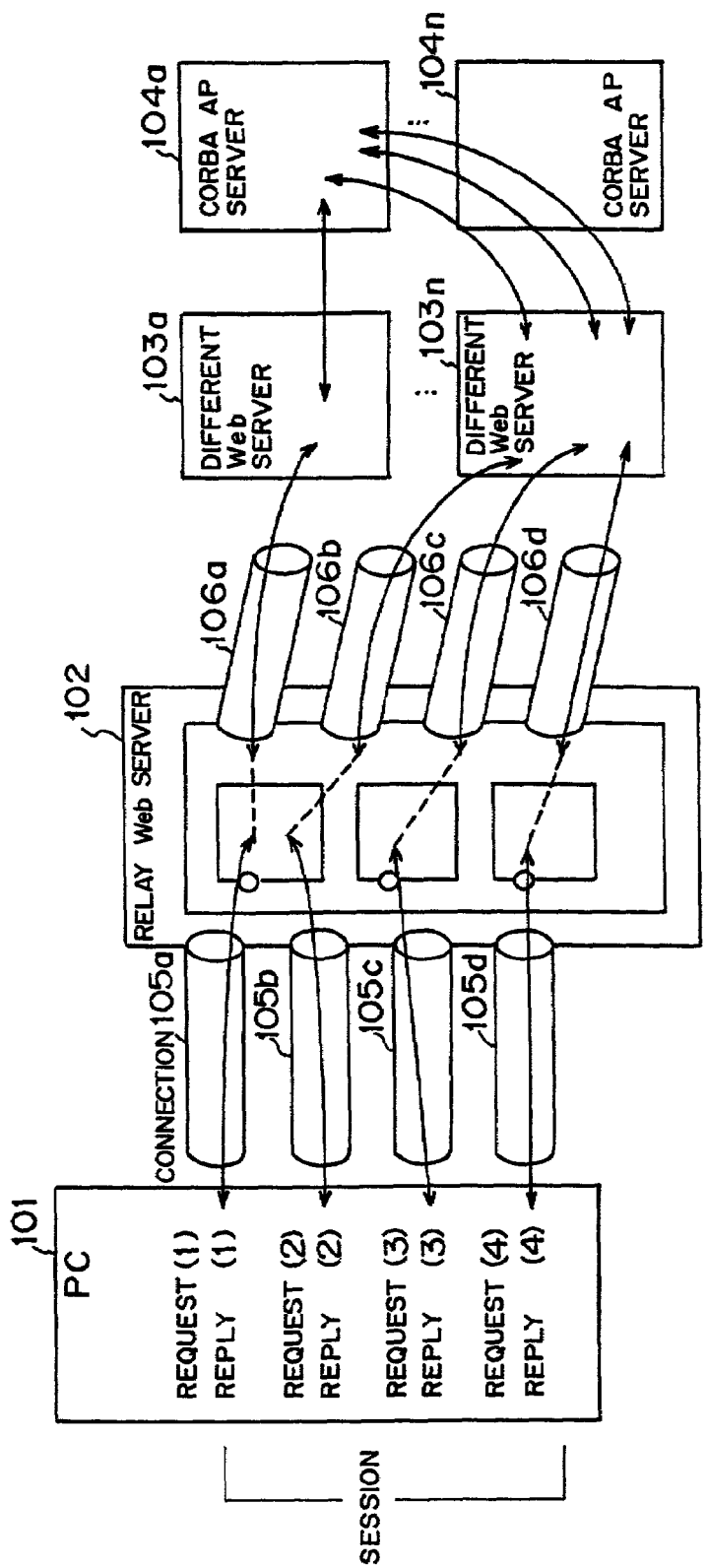
FIG. 13 exemplifies a conventional CORBA communications method using HTTP tunneling.

The respective communication devices in the above described communications systems (for example, the relay Web server 12 shown in FIG. 2, the proxy 32*a* shown in FIG. 4, etc.) can be naturally implemented by a general computer system. FIG. 12 exemplifies the configuration of such a computer system. In this figure, a computer 51 is configured by a main body 52 and a memory 53.

The memory 53 is a storage device such as a random access memory (RAM), a hard disk, a magnetic disk, etc. In memory 53, for example, the programs represented by the flowcharts shown in FIGS. 5 and 6, and a program relating to the present invention, are stored. The programs are executed by the main body 52, so that the communication distribution control according to the present invention is implemented.

Such programs can be executed by being transmitted from a program provider side via a network 54 and loaded into the computer 51, or by being stored onto a marketed and distributed portable storage medium 55 and loaded into the computer 51.

As a portable storage medium 55, a storage medium in a variety of forms such as a CD-ROM, a floppy disk, an optical disk, a magneto-optical disk, etc. is available for use. The communication distribution control system according to the present invention can be also implemented by storing the above described programs onto such a portable storage medium, and by placing the potable storage medium 55 into the computer 51.

The above provided description refers to the preferred embodiments of the present invention by focusing attention on the HTTP tunneling with which a client requests, via the Internet, a CORBA AP server to perform a process required for executing a session. However, the present invention is not limited to these implementations, and is applicable to diverse communication methods as a matter of course.

As described above, according to the present invention, it becomes possible to use the same different Web server during one session as a relay Web server that relays a communication to a CORBA AP server, thereby eliminating the need for establishing a communication connection in correspondence with a communication connection request within one session. At the same time, response performance for receiving a reply from a CORBA AP server is improved, which greatly contributes to an enhancement of the efficiency of a CORBA communication using the HTTP tunneling.

What is claimed is:

1. A communication distribution controlling method distributing one communication to any of a plurality of relay devices capable of relaying the one communication in correspondence with a connection request of the one communication within a series of communications from a client, comprising the steps of:
   receiving a communication connection request from a client;
   determining from an identifier written in a communication connection request, whether or not a communication connection used commonly for passing communications of a same one series is established; and
   connecting the requested communication to a particular relay device as a relay destination of an established communication connection if the communication connection is established,
   wherein said identifier is an IP address of said client, or is contained within the URL or header information of the communication connection request.

2. A communication distribution controlling method distributing one communication to any of a plurality of relay devices capable of relaying the one communication in correspondence with a connection request of the one communication within a series of communications from a client, comprising the steps of:
   receiving a connection request of an initial communication within a series of communications from a client;
   establishing a communication connection for the communication requested to be connected;
   connecting the requested communication to a particular relay device as a relay destination of the established connection; and
   notifying a client side of an identifier identifying the established connection so as to have the same identifier be written into connection requests of communications to follow the initial communications,
   wherein said identifier is contained within the URL or header information of the communication connection request.

3. The communication distribution controlling method according to claim 3, further comprising:
   monitoring an elapsed time from when the initial communication within the series of communications from the client is disconnected; and
   invalidating the communication connection corresponding to the series of communications, and the identifier corresponding to the communication connection, when the elapsed time exceeds a predetermined value.

4. A communication distribution controlling apparatus distributing one communication to any of a plurality of relay devices capable of relaying the one communication in correspondence with a connection request of the one communication within a series of communications from a client, comprising:
   a connection request receiving unit receiving a communication connection request from a client;
   a connection determining unit determining from an identifier written in a communication connection request, whether or not a communication connection used commonly for passing communications of a same one series is established; and
   a communication connecting unit connecting the requested communication to a particular relay device as a relay destination of an established communication connection if the communication connection is established,
   wherein said identifier is an IP address of said client, or is contained within the URL or header information of the communication connection request.

5. A communication distribution controlling apparatus distributing one communication to any of a plurality of relay devices capable of relaying the one communication in correspondence with a connection request of the one communication within a series of communications from a client, comprising:
   a connection request receiving unit receiving a connection request of an initial communication within a series of communications from a client;
   a connection establishing unit establishing a communication connection for the communication requested to be connected;
   a communication connecting unit connecting the requested communication to a particular relay device as a relay destination of the established connection; and
   a notifying unit notifying a client side of an identifier identifying the established connection so as to have the same identifier be written into connection requests of communications to follow the initial communication,
   wherein said identifier is contained within the URL or header information of the communication connection request.

6. The communication distribution controlling apparatus according to claim 5, further comprising:
   a monitoring unit monitoring an elapsed time from when the initial communication within the series of communications from the client is disconnected; and
   an invalidating unit invalidating the communication connection corresponding to the series of communications, and the identifier corresponding to the communication connection, when the elapsed time exceeds a predetermined value.

7. A computer-readable storage medium on which is recorded a program for causing a computer, which distributes one communication to any of a plurality of relay devices that can relay the one communication in correspondence with a connection request of the one communication within a series of communications from a client, to execute a process, the process comprising the steps of:

receiving a communication connection request from a client;

determining from an identifier written in a communication connection request, whether or not a communication connection used commonly for passing communications of a same one series is established; and connecting the requested communication to a particular relay device as a relay destination of an established communication connection if the communication connection is established, wherein said identifier is an IP address of said client, or is contained within the URL or header information of the communication connection request.

8. A computer-readable storage medium on which is recorded a program for causing a computer, which distributes one communication to any of a plurality of relay devices that can relay the one communication in correspondence with a connection request of the one communication within a series of communications from a client, to execute a process, the process comprising the steps of:

receiving a connection request of an initial communication within a series of communications from a client;

establishing a communication connection for the communication requested to be connected;

connecting the requested communication to a particular relay device as a relay destination of the established connection; and notifying a client side of an identifier identifying the established connection so as to have the same identifier be written into connection requests of communications to follow the initial communications, wherein said identifier is contained within the URL or header information of the communication connection request.

9. The storage medium according to claim 8, the process further comprising the steps of:

monitoring an elapsed time from when the initial communication within the series of communications from the client is disconnected; and invalidating the communication connection corresponding to the series of communications, and the identifier corresponding to the communication connection, when the elapsed time exceeds a predetermined value.

\* \* \* \* \*

UNITED STATES PATENT AND TRADEMARK OFFICE
CERTIFICATE OF CORRECTION

PATENT NO. : 7,072,965 B2  Page 1 of 1
APPLICATION NO. : 10/008747
DATED : July 4, 2006
INVENTOR(S) : Ryuutou et al.

It is certified that error appears in the above-identified patent and that said Letters Patent is hereby corrected as shown below:

In the Claims:

Claim 3
Col. 10, line 4, delete "initial communications" and insert --initial communication--.

Claim 3
Col. 10, line 9, delete "claim 3" and insert --claim 2--.

Signed and Sealed this

Second Day of January, 2007

JON W. DUDAS
*Director of the United States Patent and Trademark Office*